United States Patent Office

Re. 26,959
Reissued Sept. 29, 1970

26,959

PROCESS FOR PREPARING NON-FERMENTABLE SUGAR SUBSTITUTE AND PRODUCT THEREOF

Ernst Conrad, Lyckeby, Sweden, assignor to Lyckeby Starkelseforadling Aktiebolag, Lyckeby, Sweden, a corporation of Sweden No Drawing. Original No. 3,329,507, dated July 4, 1967, Ser. No. 363,629, Apr. 29, 1964. Application for reissue Feb. 6, 1969, Ser. No. 802,278
Claims priority, application Sweden, May 6, 1963, 4,950/63
Int. Cl. A23l *1/22*
U.S. Cl. 99—141 18 Claims

Matter enclosed in heavy brackets [ ] appears in the original patent but forms no part of this reissue specification; matter printed in italics indicates the additions made by reissue.

*ABSTRACT OF THE DISCLOSURE*

*Sugar substitute prepared by hydrogenating a saccharified starch having a dextrose equivalent of 15–75% and containing dextrines until substantially no dextrose and maltose remain.*

As a substitute for sugar other sugar-like and sweetly tasting products are used to a great extent, great importance in most cases being placed thereon that the sugar-like products are not fermentable and do not yield acid decomposition products, e.g. lactic acid, by the action of microorganisms. Such acid products are regarded to primarily cause caries in teeth in cases of high consumption of sugar-containing products, such as candies, confectionary and other sweet products.

The so-called sugar alcohols, especially sorbitol, belong to the most commonly used sugar-like products, which are manufactured industrially. As a starting material it is possible to use such polysaccharides, especially starch, which on saccharification mainly give dextrose. The dextrose is then hydrogenated in the presence of a suitable catalyst. The saccharification of the polysaccharide used as a starting material, e.g. starch, is made either by acid hydrolysis or enzymatically. Previously it was regarded as suitable to perform the saccharification as far as possible and the known processes were carried out so that the dextrose content of the material subjected to saccharification had a dextrose equivalent value of about 90%. In many cases such dextroses were directly hydrogenated to sorbitol after purification in a manner known per se. The 10% of carbohydrates remaining in the dextrose solution consisted principally of so-called water-soluble dextrines. These water-soluble dextrines were regarded as undesirable and detrimental to the quality of the sorbitol obtained and for this reason the dextrose solution obtained by saccharification was usually treated by evaporation and recrystallization for the removal of the water-soluble dextrines.

When hydrogenating a dextrose solution obtained in the known manner, which at most contained 10% of other carbohydrates other than dextrose, a sorbitol syrup was obtained which was strongly hygroscopic. This property of the sorbitol syrup can be utilized in many cases for the prevention of drying. An addition of 10% of sorbitol is usually satisfactory for considerably delaying the moisture losses and the drying-out.

By the addition of alcohol or by freezing the sorbitol can be recovered from the sorbitol syrup in the form of a white finely crystalline powder which after drying can be compressed to solid products.

When the sorbitol syrup is evaporated to dryness a candy-like semi-solid mass is obtained which, however, during storage rapidly takes up moisture from the air and reverts to the liquid form. This can only be prevented by the addition of large amounts of foreign, drying substances.

As has been mentioned above, it has already been tried to use sorbitol in the manufacture of candies, confectionary and other sweet products on account of its similarity to sugar, particularly because of its sweet taste and its failure to ferment which prevents the formation of acid caries-causing products. The hygroscopic property of sorbitol is, however, a great drawback. A further disadvantage of sorbitol is its actual but relatively weak laxative action.

The product obtained according to the present invention by the saccharification of polysaccharides giving dextrose and maltose has considerable advantages above the mentioned products containing about 90% sorbitol, particularly in that it is at the most weakly hygroscopic. Furthermore, the new product shows no or only a very weak laxative effect. The solution obtained by hydrogenation does not crystallize even on extensive cooling and can be evaporated to a solid and moldable mass, which retains its structure for an unlimited period of time even in very damp atmospheres. The new product also has the advantage of sorbitol with a view to its sugar-like character and the absence of fermentability induced by the commonly present fermentation microorganisms. As compared to sorbitol it has also the great advantage of being at the most weakly hygroscopic.

Contrary to the processes according to the prior art the polysaccharide starting material, particularly starch, is not, according to the invention, subjected to saccharification as far as possible but only to a dextrose equivalent value of 15–75%. The remaining part of the polysaccharide, which is not converted into dextrose and maltose, also in the case of the invention consists of water-soluble dextrines and by establishing a certain dextrose and maltose content between a dextrose equivalent value of 15 and 75%, the properties of the product obtained on hydrogenation, especially the remaining hygroscopicity and the laxative effect, can be varied to a large extent. The use of sorbitol prepared according to the known processes very often necessitates the use of fillers, especially fillers of a gum arabic nature, but this is not necessary with the use of the product according to the invention.

The hydrogenation of the polysaccharide which has been subjected to saccharification to a dextrose equivalent value of 15–75% can be made after or, if so desired, also simultaneously with the saccharification of the polysaccharide used as the starting material. As has already been stated above the usable starting materials include preferably starch but cellulose can also be used, since cellulose gives dextrose on saccharification.

When starch is used as the starting material it is possible to use the most different types of starch, for instance maize or potato starch. The saccharification of starch is carried out in a manner known per se by acid hydrolysis or enzymatically. As has been stated above, the degree of saccharification is varied according to the desired properties of the end product to a dextrose equivalent value between 15 and 75%. If a product is desired which is substantially non-hygroscopic the saccharification is performed only to a dextrose equivalent value of about 20%. When manufacturing non-aqueous bon-bons, satisfactory results and non-hygroscopic products are obtained which can be stored indefinitely, when the saccharification is made to a dextrose equivalent value of 20–60%. In the case of fruit pastes which must possess a certain flexibility, the saccharification is preferably continued to a higher degree corresponding to a dextrose equivalent value of more than 60%.

The saccharification product obtained from the polysaccharide raw material used according to the invention, and particularly from starch having a dextrose equivalent value of 15–75% is then in the manner known hydrogenated catalytically to form sorbitol from dextrose and maltose. The hygroscopic properties of the sorbitol are, however, blocked by the dextrines present in the product obtained, but, as has been stated above, the product obtained has the same sugarlike properties as sorbitol or the sugarlike properties are even greater since, as is known, saccharose does not show any mentionbale hygroscopic properties.

In many case it is not possible to continue the hydrogenation so that the hydrogenation product is completely free from dextrose and maltose; on the contrary the hydrogenation product has a small residual amount of sugar content of up to 1%. For many purposes this small sugar content is not disturbing; when it is desired to obtain a product which does not contain any fermentable sugar this small sugar content can, however, be disturbing. The sugar can be removed either by fermentation with the use of those yeast cultures which in the fermentation give alcohol, lactic acid, acetic acid or other products. It is also possible to remove the remaining sugar content with the use of bacteria species present in the human mouth. Another possibility is to prevent the fermentability of the sugar by blocking additives, such as urea. It is already known to prevent the fermentation in the mouth of sugar containing products by the addition of urea to the dry solids. In this case the urea addition is usually 5–10% but according to the process of the invention it is only necessary to add very much smaller amounts of urea, i.e. 0.1–0.5%, in order to prevent the fermentability of the remaining sugar.

The invention is further illustrated by the following examples.

EXAMPLE 1

A suspension of potato starch having a dry solids content of 45% (2000 kgs. of potato flour containing 1800 kgs. of dry starch, and 2000 liters of water) was admixed with 15 liters of 37% technical hydrochloric acid, the pH of the solution obtained being 1.8. The saccharification was continued for 35 minutes at a temperature of 140° C. and at a steam pressure of 3.5 atm. A dextrose equivalent value of about 40% was obtained. The reaction mixture was then neutralized with 50 liters of a 15% sodium carbonate solution, resulting in a pH of 6.0. The solution was decolorized with active charcoal and transferred to a hydrogenation equipment, where 1%, calculated on the dry starch, of a Raney nickel catalyst was added, i.e. 18 kgs. of the catalyst. The hydrogenation was carried out at a hydrogen pressure of about 75 atm. and at a temperature of 150° C. The hydrogen consumption amounted to 100 m.$^3$ (as measured under normal conditions of pressure and temperature). The hydrogenation was continued until almost all of the sugar had been reduced. The catalyst was then removed by centrifugation and the solution was passed through both a cationic exchanger and an anionic exchanger for removal of metal ions and acid ions. If desired 0.5% of urea was added, calculated on the dry starch, i.e. 9 kgs.

EXAMPLE 2

Instead of an acid saccharification, as in the previous example, it is also possible to saccharify with the use of suitable enzymes. The 45% starch suspension of Example 1 was admixed with 5 kgs. enzyme ("Biolas C 48," manufactured by Farbwerke Hoechst AG). If necessary the pH was adjusted to 6.5 at the addition of the enzyme and during the enzymatic degradation. The suspension was heated for 20 minutes at 85° C., a dextrose equivalent value of about 30% being obtained. The enzyme was then deactivated by heating the mixture to 100° C. for 15 minutes. The purification of the solution obtained and the hydrogenation was then carried out as described in Example 1. During the hydrogenation 72 m.$^3$ of hydrogen were consumed (as calculated under normal conditions of temperature and pressure).

I claim:

1. A process for the preparation of a sweet tasting non-fermentable and substantially non-hygroscopic sugar substitute from polysaccharides, which consists essentially of subjecting starch to saccharification to form a product having a dextrose equivalent value of 15–75% and containing water-soluble dextrines, catalytically hydrogenating the saccharification mixture until substantially no dextrose and maltose remain and recovering the substantially non-fermentable, non-hygroscopic water-soluble dextrine containing sorbitol product thereby produced.

2. A process according to claim 1 wherein said saccharification and hydrogenating are carried out simultaneously.

3. A process according to claim 1 wherein said hydrogenation is carried out after said saccharification has been completed.

4. A process according to claim 1 wherein the reaction mixture following said hydrogenation is treated for removal of hydrogenation catalyst and any metal and/or acid ions present therein.

5. A process according to claim 1 which comprises carrying out said saccharification to form a product having a dextrose equivalent value of not more than 20%.

6. A process according to claim 1 which comprises carrying out said saccharification to form a product having a dextrose equivalent value of from 20 to 60%.

7. A process according to claim 1 which comprises carrying out said saccharification to form a product having a dextrose equivalent value of about 60%.

8. A process according to claim 1 wherein said saccharification is carried out as an acid hydrolysis.

9. A process according to claim 1 wherein said saccharification is carried out enzymatically.

10. A process according to claim 1 wherein Raney nickel is employed as catalyst in said hydrogenation.

11. A process according to claim 1 wherein any sugar remaining in the hydrogenation reaction product is removed by subjecting said reaction product to fermentation.

12. A process according to claim 11 wherein said fermentation is conducted using yeast cultures whereby said sugar is converted to lactic acid.

13. A process according to claim 11 wherein said fermentation is conducted using bacteria normally present in the human mouth.

14. A process according to claim 1 wherein any sugar remaining in the hydrogenation reaction product is rendered non-fermentable by the addition of urea thereto.

15. A process according to claim 14 wherein said urea is added in an amount of 0.1–0.5% referred to the dry starch.

16. A process according to claim 1 wherein the saccharification reaction product is decolorized by contacting the same with active charcoal.

17. A process according to claim 1 wherein the reaction mixture following said hydrogenation is treated for removal of hydrogenation catalyst and any metal and/or acid ions present therein, and is thereafter evaporated to dryness.

18. The product produced by the process of claim [17] *1*.

References Cited

The following references, cited by the examiner, are of record in the patented file of this patent or the original patent.

UNITED STATES PATENTS

| | | | |
|---|---|---|---|
| 1,952,643 | 3/1964 | Wallace | 195—2 |
| 2,116,665 | 5/1938 | Brown | 195—2 |
| 2,518,235 | 8/1950 | Hartstra et al. | 260—635 |
| 2,822,303 | 2/1958 | Campbell | 195—11 |
| 2,859,113 | 11/1958 | Goodfriend | 99—141 |
| 2,965,520 | 12/1960 | Snyder et al. | 195—31 |
| 2,968,680 | 1/1961 | Kasehagen | 260—635 |

OTHER REFERENCES

Grubb, Journal of Dental Research, vol. 24, No. 1, pp. 31–44, February 1945.

ALVIN E. TANENHOLTZ, Primary Examiner

U.S. Cl. X.R.

99—138, 142; 195—2, 11, 31; 260—635